Sept. 29, 1959     E. J. SCHAEFER     2,906,986
CABLE CONNECTOR
Filed April 23, 1954     2 Sheets-Sheet 1
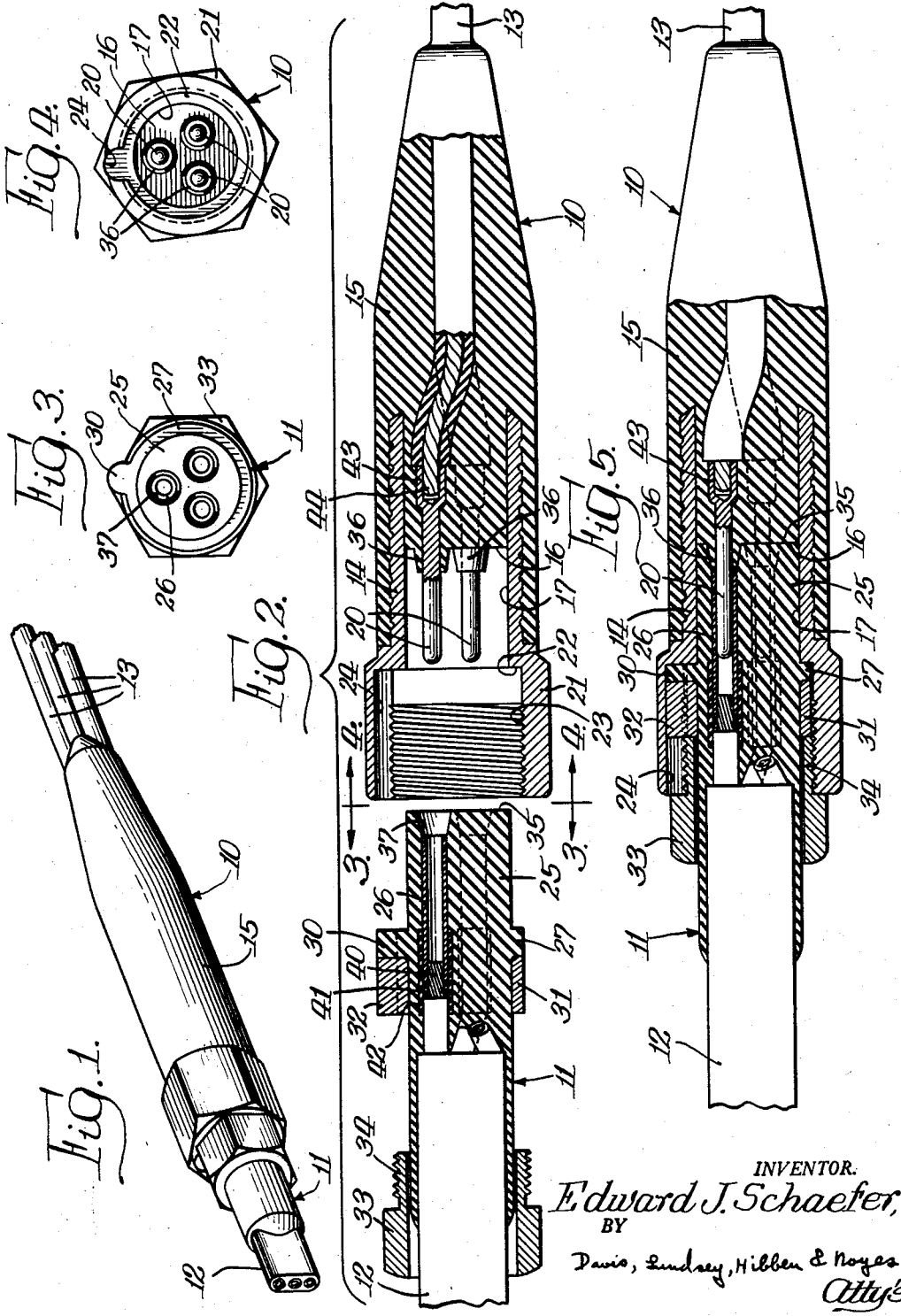
INVENTOR.
Edward J. Schaefer,
BY
Davis, Lindsey, Hibben & Noyes
Atty's.

Sept. 29, 1959  E. J. SCHAEFER  2,906,986
CABLE CONNECTOR
Filed April 23, 1954  2 Sheets-Sheet 2
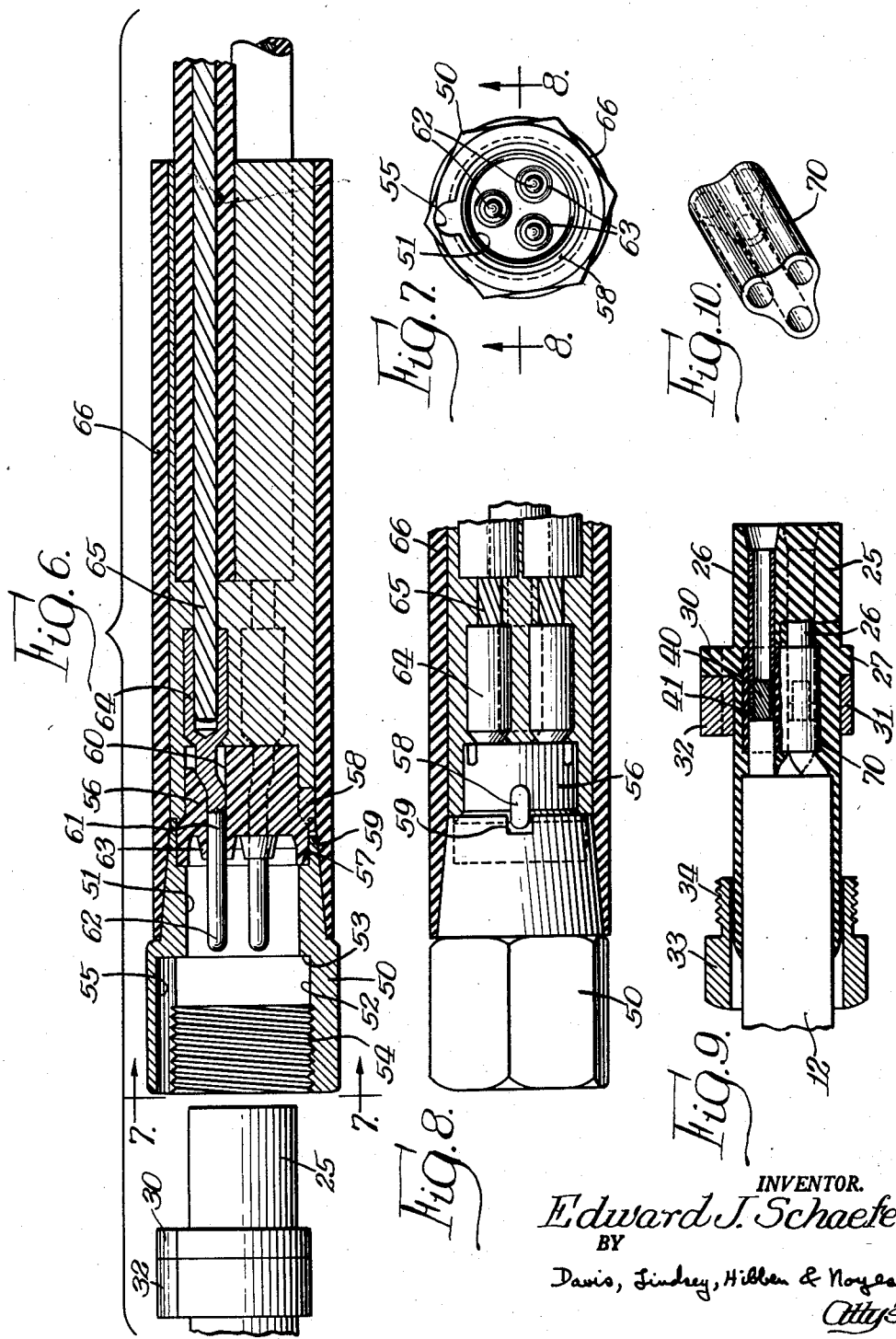
INVENTOR.
Edward J. Schaefer
BY
Davis, Lindsey, Hibben & Noyes
Att'ys.

United States Patent Office 2,906,986
Patented Sept. 29, 1959

2,906,986

CABLE CONNECTOR

Edward J. Schaefer, Fort Wayne, Ind.

Application April 23, 1954, Serial No. 425,087

7 Claims. (Cl. 339—60)

The invention relates generally to electrical wiring connections and more particularly to a cable connector.

The general object of the invention is to provide a novel cable connector adapted for use submerged in liquids which would cause short-circuiting if the liquid reached the conductors thereof, and capable of withstanding high pressures in the submerging liquid.

Another object is to provide a novel connector of the foregoing type for a cable comprising a plurality of conductors, the connector being constructed so that in assembly the proper polarized relation is obtained between the connected conductors.

A further object is to provide a novel cable connector which is relatively small and compact and is therefore particularly useful in locations where space is a minimum.

Still another object is to provide a novel cable connector, the parts of which may be easily assembled and disassembled, with assurance that, when assembled, the parts fit together in the proper manner.

It is also an object to provide a novel cable connector part for use either with another suitably constructed cooperating cable part or with a suitably constructed terminal structure embodied in a piece of electrical apparatus such as a motor.

A still further object is a novel cable connector comprising two separable parts, one of which may be attached to the cable in the field.

Other objects and advantages will become apparent from the following description taken in connection with the accompanying drawing, in which:

Fig. 1 is a perspective view of a two-part cable connector embodying the features of the invention;

Fig. 2 is an enlarged longitudinal sectional view showing the two parts of the cable connector when separated but in position to be assembled to each other;

Fig. 3 is an end view of he left-hand connector part shown in Fig. 2 as indicated by the line 3—3;

Fig. 4 is an end view of the right-hand connector part shown in Fig. 2, as indicated by the line 4—4;

Fig. 5 is a view similar to Fig. 2 but showing the two parts of the connector when assembled to each other;

Fig. 6 is a longitudinal sectional view of one of the parts of the connector, in a form which is adapted for connection to the cable in the field;

Fig. 7 is an end view of the left-hand end of the connector part shown in Fig. 6;

Fig. 8 is a fragmentary side elevational view partially broken away to show portions of the structure of the connector part illustrated in Fig. 6;

Fig. 9 is an enlarged longitudinal sectional view showing a modified form of the left-hand connector part; and Fig. 10 is a perspective view of one of the elements utilized in the connector part shown in Fig. 9.

A cable connector embodying the features of the invention is particularly adapted for use submerged in a liquid which would cause short circuiting if the liquid reached the conductors within the connector. It is also designed for use under these conditions where the liquid pressure may be large. The connector is of a type adapted for use with cable having a plurality of conductors therein, and the two parts of the connector are such that they can be assembled only in a way that provides proper polarized relation between the conductors in the respective cable parts. In motors which are adapted for operation submerged in a well, the restriction of space due to the diameter of the well casing presents problems in designing apparatus sufficiently compact for use in such a location. The present connector is particularly adapted for such conditions since it is of an elongated construction of relatively small cross-sectional size so that it can be readily used in wells or the like where space is a minimum.

While the connector is illustrated as being made of two parts adapted to be assembled together, either one of the parts may be used with a suitably constructed terminal structure similar in character to the other part but embodied in a piece of electrical apparatus such as a motor. Thus, if a connection between cables is to be made at some point above the motor within the well, the two parts of the connector shown in the drawing are used. However, in some instances it may be desirable to embody one of these parts as a terminal structure in a motor so that the cable connection is made directly to the motor. For example, the motor might have a terminal structure embodied therein at least partially similar in character to the left-hand member shown in Fig. 2, and the cable to be connected thereto would be provided on its lower end with a terminal structure similar to the right-hand part shown in Fig. 2.

For purposes of illustration, the reference numeral 10 indicates generally the right-hand connector part or socket member while the numeral 11 indicates generally the left-hand connector part or plug member. The type of cable with which the connector is illustrated as being used is herein shown as a three-wire cable with the wires in flat side-by-side relation to each other, each of course being provided with proper insulating and protective covering with the outer layers of such covering holding the wires together as a single cable. While such form of cable is herein shown for purposes of illustration, the covering of course is not limited to this particular type of cable. Thus in Figs. 1, 2 and 5 I have shown the main cable, indicated at 12 as being of this type and attached to the connector part 11, while the cable extending from the connector part 10 comprises three individual wires 13 illustrated in Fig. 1.

The connector part 10, in its preferred form, comprises a metal sleeve 14 and an insulating body 15. The insulating body 15 is preferably made of neoprene which is sulphur-free and moisture resistant and has low water absorption, and is molded onto the sleeve 14 and preferably covers the exterior thereof. The insulating body 15 also extends into the interior of the sleeve and has its end surface, indicated at 16, spaced from the other end of the sleeve to provide a socket portion 17 therein. The conductors 13 of the cable attached to the right-hand connector part 10 extend into and are embedded in the insulating body 15, the ends of the respective conductors being turned into a triangular relation with each other at their inner ends rather than in a flat side-by-side relation that they occupy externally of the insulating body 15.

Also embedded in the insulating body 15 and particularly that portion extending within the sleeve 14 is a plurality of prongs 20 which also occupy a triangular relationship with each other. The prongs are electrically connected with the conductors or wires constituting the cable and project beyond the end surface 16 of the insulating body 15 and into the socket portion 17.

Beyond the socket portion 17, the sleeve 14 is provided with an enlarged portion 21 providing an inner transverse shoulder 22 at the outer end of the socket portion 17. The interior of the enlarged portion for a part of its length is threaded as at 23, and a longitudinally extending groove 24 is provided at one side of the enlarged portion 21 interiorly thereof, with the groove 24 extending from the outer end inwardly to the transverse shoulder 22.

The connector part 11 constitutes a plug member for insertion into the socket portion 17 of the connector part 10 and comprises a second insulating body 25 preferable made of neoprene. The second insulating body 25 is molded about the end portion of the cable 12 and has embedded therein a plurality of metal tubes 26 connected to the respective conductors of the cable 12. When the plug member comprising the second insulating body 25 is inserted into the socket portion 17 of the connector part 10, the tubes 26 fit tightly over the respective prongs 20 to provide electrical connection therewith.

The second insulating body 25 comprises an end portion which is of such diameter that it is readily insertable into the socket portion 17 of the sleeve 14. Beyond such end portion, the second insulating member 25 is provided intermediate its ends with a flange 27 fitting within enlarged portions 21 of the sleeve 14. At one side, the flange 27 is provided with a lug 30 adapted to enter within the groove 24 so as to permit assembly of the two parts of the connector in only one position rotatively of each other. By this means, each of the tubes 26 in the connector part 11 is permitted to contact only a certain one of the prongs 20 in the connector part 10 so that proper polarized relation is obtained between the connected conductors of the cable 12 and 13.

To assist in properly positioning the connector part 11 within the connector part 10 and to cooperate with means for securing the two parts of the connector together, a metal ring 31 is mounted on the second insulating body 25 in back of the flange 27 and is provided with a lug 32 on one side aligned with and constituting a continuation of the lug 30 on the flange 27. The lug 32 of the ring 31 thus enters the groove 24 along with the lug 30 to properly polarize the parts. To secure the two parts of the connector together, a nut 33 fits loosely over the outer end of the insulating body 25 and is provided with an exteriorly threaded portion 34 adapted to be screwed into the threads 23 of the enlarged portion 21 of sleeve 14.

The end of the threaded portion 34 of the nut, when the latter is screwed down tight, bears against the ring 31 to force the connector part 11 into proper assembled relation with the connector part 10. The parts are so dimensioned that at least two points of sealing spaced from each other are provided between the two connector parts. Thus, the end surface, indicated at 35, of the second insulating body 25 is seated tightly against the end surface 16 of the first insulating body 15 within the socket portion 17. Also, the flange 27 of the second insulating body 25 is seated tightly against shoulder 22 formed within the sleeve 14 to form an annular seal at this point. Thus, two points of sealing are provided, which are longitudinally spaced from each other. To prevent any chance of leakage along the groove 24, the lug 30 on the flange 27 is also compressed against the bottom of the groove to effect sealing at that point.

It will be noted that the flange 27 as well as the lug 30 thereon is much thicker when in the free state as illustrated in Fig. 2, than it is when compressed in assembled relation as shown in Fig. 5. Such compression of the flange 27 and lug 30, since the material of which these are made has the characteristics of rubber, causes the flange and lug to expand radially so that they are in tight peripheral engagement with the surrounding areas of the enlarged portion 21 of the sleeve and of the groove 24. Thus, not only is a seal effected against the shoulder 22, but such seal is continued outwardly to the peripheral portions of the cooperating parts. The compression of the flange 27 also causes an increase in the effective length of the end portion of the second insulating body 25 which fits into the socket portion 17. Since this end portion of the second insulating body 25 has normally a length substantially equal to the depth of the socket, the increased effective length of the end portion, as the parts are screwed up tight, causes a radial expansion of the end portion 25 since the end surface 35 thereof abuts against the end surface 16 of the first insulating member 15. Such radial expansion of the end portion of the second insulating member 25 causes the periphery of such end portion to contact tightly against the interior surface of the sleeve 14 and thus have a sealing effect extending all the way from the end surface 16 to the shoulder 22. With such effective sealing arrangement between the two parts of the connector, leakage of liquid from the exterior of the connector to the socket portion 17 and particularly to the prongs 20 therein is prevented.

The construction herein disclosed also includes means within the socket portion 17 which effects further sealing and prevents any electrical creepage between the prongs 20 by increasing the length of path required for such creepage. To this end, the first insulating member 15 is provided with conical collar portions 36 extending outwardly from the end surface 16 and about the adjacent portions of the respective prongs 20. Correspondingly, the ends of the tubes 26 embedded in the second insulating member 25 are spaced from the end surface 35 of the second insulating member, and a plurality of counterbores 37 are formed therein in alignment with the respective tubes 26. The counterbores 37 fit snugly on the conical collar portions 36 and are wedged thereon when the two connector parts are tightly connected together by the nut 33. Such wedging action between the counterbores and the conical collar portions 36 increases the effective area of sealing between the two parts and also increases the length of the path from one prong to another along the surfaces of abutment of the two insulating parts so as to decrease the chance of electrical creepage from one prong to another.

While it is evident from the foregoing description that the two parts of the connector are so effectively sealed to each other that no liquid can leak between the parts thereof to the interior where the electrical contacts are made, still there is another source of leakage for liquid which sometimes occurs and for which provision must be made. Thus, the cables extending from the respective connector parts might be punctured in some manner that would permit leakage of liquid into the strands of wire of which the conductors are composed. If this occurs, it might be possible for such liquid to work along the strands to the connector. However, in both parts of the connector, I have made provision to prevent access of any such liquid to the point of contact between the prongs 20 and the tubes 26.

For this purpose, in the connector part 11 the end of each stranded conductor is stripped of its own insulation to provide a bared end section 40 having a portion extending into its tube 26. The portion within the tube is tinned and saturated with solder when inserted into the tube and forms a seal preventing any moisture from creeping along the strands and entering the tube. A portion of the bared section lies beyond the end of the tube 26 and is coated with an insulating resin 41, such as an epoxy resin, to form a bond about the bared section and connecting the insulation of the conductor with the tube 26. Exteriorly of the resin bonding 41, a short plastic sleeve 42 is slipped over the assembly to extend at one end over the insulation for the conductor and at its other end over the tube 26. In order to insure a tight fit, the sleeve 42 may be soaked in a solvent such as toluol to dilate it and then slipped over the assembly. When the solvent evaporates, the sleeve shrinks and fits tightly over the assembly. The sleeve 42 of course is embedded in the second insulating member 25. A highly effective seal is thereby provided which prevents any chance of liquid creeping along the strands of the conductor into the tube 26.

In the connector part 10, provision is also made for preventing any liquid from creeping along the strands of the conductors 13 and to the portions of the prongs 20 which contact with the tubes 26. To this end, each prong 20 is provided on the end thereof embedded in the first insulating member 15, with a cup portion 43. The end of the conductor 13 associated with the prong is bared, as at 44, for a short distance sufficient for insertion into the cup portion 43 and is soldered therein. Preferably the length of the bared portion 44 is such that the cup portion 43 abuts against the end of the insulation on the conductor. Consequently any moisture that might creep along the strands of the conductor cannot go beyond the cup portion since the latter, together with the insulation on the conductor, is tightly embedded in the insulating member 15. Thus, no moisture can reach the exposed portions 20 of the prongs which make contact with the tubes 26.

It will be noted that the prongs 20 lie wholly within the socket portion 17 and do not project beyond the end thereof. Since the tubes 26 embedded in the second insulating member 25 of the plug are spaced inwardly from the end surface 35 of the second insulating body, the latter must enter the socket portion 17 before any contact is made between the prongs 20 and the tubes 26. The parts are also so dimensioned that the depth of the enlarged portion 21 from the outer end thereof to the shoulder 22 is greater than the length of the second insulating body 25 from the flange 27 to the end face 35 thereof. With such dimensioning, the lug 30 on the flange 27 of the plug member will enter the groove 24 of the socket member to properly position the parts rotatively of each other before the end of the second insulating body 25 enters the socket portion 17 and of course before the tubes 26 contact the prongs 20. Further, the distance from the outer end of the tubes 26 to the ring 31 is less than the distance from the ends of the prongs 20 to the outer end of the enlarged portion 21. Consequently at least a portion of the lug 32 on the ring 31 will enter the groove 24 before contact is made between the prongs 20 and the tubes 26. Thus, a properly polarized relation between the two connector parts is established before any electrical contacts are made.

With the above-described embodiment of the invention, the connector parts are secured to the cable at the factory since neither of the parts can readily be connected in the field. However, there are many instances where the depth at which the motor and pump are mounted in a well is not readily determined beforehand and must be determined at the time of installation. Thus, the length of the cable needed to extend from the motor to the ground cannot be accurately determined until time of installation. For this reason, it is sometimes necessary to cut the cable to the proper length at the time of installation and then attach the connector part to it. Usually the part having the prongs and the socket portion, such as the part 10, is the part which is attached to the upwardly extending cable.

In Figs. 6, 7 and 8, I have shown another embodiment of the invention which is adapted for such use in that it can be readily attached to the cable by a workman in the field. To this end, the connector part shown in these figures comprises a metal sleeve 50 having a portion 51 therein constituting the second portion of the sleeve. Outwardly of the socket portion 51, the interior of the sleeve is enlarged as at 52 to provide a shoulder 53. The outer part of the enlarged portion 52 is internally threaded as at 54 to receive the nut 33 for holding the other connector part in assembled relation therewith. The enlarged portion 52 as well as the threaded portion 54 is provided with a longitudinally extending groove 55 at one side, similar to the groove 24 in the first form, to receive the lugs 30 and 32 of the other connector part.

Mounted in the other end of the sleeve 50 is an insulating plug 56 which preferably is press-fitted into the sleeve 50 in abutment with a small shoulder 57 formed therein. In order to properly position the plug 56 rotatively, it is provided with a lug 58 on its exterior, adapted to enter a slot 59 in the inner end of the sleeve 50. The plug 56 is provided with a plurality of openings 60 extending therethrough, to receive prong members 61 adapted to be connected to the respective conductors of the cable. The inner end of each prong member, indicated at 62, extends into the socket portion 51 of the sleeve 50 to engage contacts in the other connector part. The plug 56 is also provided with conical portions 63 extending about the adjacent portions of the respective prongs 62. Thus, the interior of the sleeve 50 is constructed similarly to the sleeve 14 the first-described form and is similarly dimensioned so that it will inter-fit with a connector part having the construction of the connector part 11. The outer end of each prong member is provided with a cup-shaped portion 64 into which the bared end 65 of a conductor extends and is soldered therein.

To enclose the parts, an insulating tube 66 is secured to the inner end of the sleeve 50. In the present instance the tube 66 is shown as having a tapered fit over the end of the sleeve 50. The tube 66 is of sufficient length to enclose the plug 56 as well as the attaching portions 64 of the prongs and a substantial length of the conductor.

To secure all the parts of this embodiment of the invention together, the tube 66 is filled with an adhesive water-proof insulating material. It has been found that a catalyzed resin, such as epoxy resin, is highly satisfactory for this purpose since it can be made up in a free-flowing liquid form and thus can be poured into the tube 66 to completely fill the spaces therein. It thereafter hardens or sets to rigidly hold the parts in assembled relation.

In attaching this form of connector part to the cable in the field, the sleeve 66 is first slipped over the cable. The attaching means 64 of the prongs 61 are then soldered to the bared ends of the respective conductors of the cable, and the prongs are then inserted through the plug 56 so that the prongs 62 occupy the proper position within the socket portion 51 of the sleeve 50. The plug 56 may be assembled in the sleeve 50 at the factory or may be inserted therein when attaching the connector part to the cable. After the prongs have been attached to the conductors and inserted in the plug 56, the sleeve 66 is then slid along the cable until it is tightly engaged with the taper portion of the sleeve 50. The tube 66 is then ready for filling with the epoxy resin. Such resin may be procured ready for mixing with a suitable amount of solvent and when so mixed is highly liquid so that by holding the tube 66 upright with the left-hand end at the top, the liquid resin may be poured into the tube to completely permeate and fill all the space therein. The epoxy resin sets or hardens within a comparatively short time so that the conductors as well as the prong members and plug are rigidly held in place within the tube 66 and in proper relation with the sleeve 50. When the resin has hardened sufficiently, the entire connector part may be assembled with the other connector part 11 in the same manner as in the first form.

In Figs. 9 and 10, I have shown a modified form of construction for the left-hand or plug member. Difficulty is sometimes experienced on forming the insulating body 25 in forcing the insulating material in between the respective conductors constituting the cable 12, particularly at the point where the outer insulating cover of the cable 12 is removed to separate the respective leads and arrange them in a triangular manner to connect with the tubular contacts 26. When the insulating material is not properly forced in between the respective leads, any seepage through the outer insulating cover of the cable 12 could thus freely reach the contacts.

To avoid this difficulty, I may employ a single insulating member 70 for all three leads instead of the separate insulating sleeves 42 for the respective leads. The insulating member 70 is provided with three longitudinally extending holes therethrough to receive the respective leads and extends at one end over the insulating covers for the individual conductors and at its other end over the tubes 26. The insulating member 70 is preferably made of plastic and to insure a tight fit around the leads, the member 70 may be dilated by soaking it in a solvent and then slipped over the tubes 26 and conductors. As the solvent evaporates, the member 70 shrinks tightly on the elements enclosed thereby. The member 70 also assists in holding the tubular contacts 26 in the desired triangular arrangement relative to each other.

From the foregoing description, it will be evident that I have provided a novel cable connector comprising two disconnectable parts which may be easily assembled together and which is adapted for use when submerged in a liquid which may be under relatively high pressure. The connector is compact in form and thus is particularly useful in locations where space is a minimum, such as in wells. While I have shown a connector comprising two disconnectable parts, the essential portions of either part may be embodied in a piece of electrical apparatus such as a motor to enable the other part to be connected thereto as a means for effecting the connection of the cable to such electrical apparatus.

I claim:

1. A cable connector comprising a socket member comprising a rigid sleeve having a socket portion and an enlarged portion beyond the socket portion, and a resilient insulating body projecting into the socket portion and forming the inner end thereof and having prongs embedded therein with the prongs projecting beyond the insulating body into the socket portion, a plug member comprising a second resilient insulating body having an end portion fitting within said socket portion with the end surface thereof seated against said first insulating body and a flanged portion seated in said enlarged portion, and a plurality of tubes embedded in said second insulating body and fitting over said prongs, said enlarged portion of said sleeve having a longitudinally extending groove in one side thereof and said plug member having a lug extending into said groove whereby said plug member can be inserted into said socket member in only one position, and means encircling said second insulating body and threaded into said enlarged portion for clamping the two members together.

2. A cable connector comprising a socket member comprising a metal sleeve, an insulating body extending part way into said sleeve to provide a socket portion within said sleeve beyond said insulating body, a plurality of prongs embedded in said insulating body and projecting therebeyond into said socket portion, said sleeve beyond said socket portion having an enlarged portion providing a shoulder, a plug member comprising a second insulating body extending through said enlarged portion and fitting snugly within said socket portion, and a plurality of tubes embedded in said second insulating body and fitting over said prongs, said second insulating body having a flange fitting within said enlarged portion and seated against said shoulder, said enlarged portion having a groove at one side and said flange having a lug fitting within said groove to permit insertion of the plug member in only one position in said socket member, and a nut threaded in said enlarged portion and clamping said flange against said shoulder and the end of said second insulating body against said first insulating body.

3. A cable connector comprising a socket member comprising a metal sleeve, an insulating body extending part way into said sleeve to provide a socket portion within said sleeve beyond said insulating body, a plurality of prongs embedded in said insulating body and projecting therebeyond into said socket portion, said sleeve beyond said socket portion having an enlarged portion providing a shoulder, a plug member comprising a second insulating body extending through said enlarged portion and fitting snugly within said socket portion, and a plurality of tubes embedded in said second insulating body and fitting over said prongs, said second insulating body having a flange fitting within said enlarged portion and seated against said shoulder, said plug member having a metal ring embracing said second insulating member and engaging said flange, said enlarged portion of said sleeve having a longitudinal groove in one side, and said flange and said ring having lug portions fitting within said groove to permit insertion of the plug member in only one position in said socket member, and a nut threaded in said enlarged portion and bearing against said ring to clamp said flange against said shoulder and the end of said second insulating body against said first insulating body.

3. A cable connector comprising a socket member comprising a metal sleeve having an insulating body extending part way into said sleeve to form a socket portion within said sleeve, said insulating portion having a plurality of prongs embedded therein and extending into said socket portion with the exposed part of said prongs positioned wholly within said socket portion, said sleeve having a portion extending beyond said socket portion and having a longitudinally extending groove at one side thereof, a plug member comprising an insulating body adapted to be inserted into said member and the socket portion thereof and having a plurality of tubes embedded therein adapted to fit over said prongs in electrical contact therewith, said plug member having a lug on one side thereof adapted to enter said groove to position the plug member in one position rotatively of said socket member, the length of the socket member beyond the end of said socket portion being greater than the length from said lug to the end of said plug member, whereby said lug enters said groove before the end of said plug enters socket portion and before asid tube engage said prongs, and means for clamping the two members together.

5. A cable connector comprising a socket member comprising a metal sleeve having an insulating body extending part way into said sleeve to form a socket portion within said sleeve, said insulating portion having a plurality of prongs embedded therein and extending into said socket portion with the exposed part of said prongs positioned wholly within said socket portion, said sleeve having a portion extending beyond said socket portion and having a longitudinally extending groove at one side thereof, a plug member comprising an insulating body adapted to be inserted into said member and the socket portion thereof and having a plurality of tubes embedded therein adapted to fit over said prongs in electrical contact therewith, the ends of said tubes being spaced inwardly from the end of the surrounding insulating body, the insulating body of the plug member having a metal ring intermediate its ends and said ring and insulating body having adjoining lugs adapted to enter said groove to position the plug member in one position rotatively of said socket member, the length of the socket member from the outer ends of said prongs to the end of the sleeve being such that, on inserting the plug member into the socket member, the lug on the insulating body and at least a portion of the lug on the ring enters said groove before said tubes contact said prongs, and means for clamping the members together.

6. A connector part for association with a cooperating separable part and adapted to be connected in the field to a plurality of conductors, said connector part comprising a metal sleeve adapted to receive and be secured to said cooperating part, an insulating plug mounted in said sleeve and having a plurality of openings therethrough, a plurality of prongs each having attaching means for a conductor one one end with the other end adapted to be inserted through one of said openings in the plug and into said sleeve for engagement by said cooperating part, an insulating tube adapted at one end to fit over the end of said sleeve and to extend from said sleeve over a portion of said conductors, and an adhesive insulating material initially in liquid form filling said tube and hardening to secure said conductors, prongs and plug in place within said tube.

7. In a cable connector comprising a pair of separable parts, one of said parts comprising an insulating body adapted to be secured to the other part and having a plurality of tubes embedded therein and adapted to fit over prongs on the other part, an insulated conductor for each tube having an insulated portion extending into and embedded in said insulating body and a bared end section extending into said tube for electrical connection therewith, and an insulating member embedded in said insulating body and having a plurality of holes therethrough and tightly embracing the insulated portions of said conductors at one end and said tubes at the other end and holding said tubes in a predetermined position relative to each other.

References Cited in the file of this patent

UNITED STATES PATENTS

| | | |
|---|---|---|
| 2,014,853 | Ley | Sept. 17, 1935 |
| 2,275,762 | Horton | Mar. 10, 1942 |
| 2,337,618 | Miller | Dec. 28, 1943 |
| 2,396,702 | Johnson et al. | Mar. 19, 1946 |
| 2,540,012 | Salati | Jan. 30, 1951 |
| 2,563,712 | Frei et al. | Aug. 7, 1951 |
| 2,563,713 | Frei et al. | Aug. 7, 1951 |
| 2,563,762 | Uline | Aug. 7, 1951 |
| 2,590,160 | Dixon | Mar. 25, 1952 |
| 2,593,182 | Quackenbush | Apr. 15, 1952 |
| 2,616,942 | Simpson | Nov. 4, 1952 |
| 2,624,286 | Smith | Jan. 6, 1953 |
| 2,677,115 | Stevens | Apr. 27, 1954 |
| 2,731,610 | Thacker | Jan. 17, 1956 |
| 2,748,361 | Dixon | May 29, 1956 |
| 2,787,770 | Arson | Apr. 2, 1957 |

UNITED STATES PATENT OFFICE

CERTIFICATE OF CORRECTION

Patent No. 2,906,986                  September 29, 1959

Edward J. Schaefer

It is hereby certified that error appears in the printed specification of the above numbered patent requiring correction and that the said Letters Patent should read as corrected below.

Column 5, line 67, for "second" read -- socket --; column 8, line 18, for "3." read -- 4. --; line 38, for "asid tube" read -- said tubes --.

Signed and sealed this 12th day of April 1960.

(SEAL)

Attest:

KARL H. AXLINE
Attesting Officer

ROBERT C. WATSON
Commissioner of Patents